United States Patent [19]

Geier

[11] Patent Number: 4,964,669
[45] Date of Patent: Oct. 23, 1990

[54] FOLDABLE TOP FOR TRUCK BED

[76] Inventor: William F. Geier, Rt. 1, Box 742, White Stone, Va. 22578

[21] Appl. No.: 435,983

[22] Filed: Nov. 13, 1989

[51] Int. Cl.$^5$ ............................................. B60J 7/12
[52] U.S. Cl. .................................. 296/108; 296/26; 296/100; 296/165; 135/88
[58] Field of Search .............. 296/107, 156, 159, 173, 296/26, 27, 100, 108; 135/88

[56] References Cited

U.S. PATENT DOCUMENTS

| | | | |
|---|---|---|---|
| 3,323,827 | 6/1967 | Lundby | 296/173 |
| 3,773,379 | 11/1973 | Loiseau | 296/107 |
| 4,310,194 | 1/1982 | Biller | 296/159 |
| 4,566,729 | 1/1986 | Magnino | 296/26 |
| 4,850,634 | 7/1989 | Taubitz | 296/107 |

Primary Examiner—Robert R. Song
Attorney, Agent, or Firm—Charles E. Brown; Charles A. Brown

[57] ABSTRACT

This relates to a foldable cover for a truck bed, particularly pickup truck beds. The foldable top includes a bed rail which may be readily secured to the truck bed and the bed rail carries a pair of transversely aligned primary support hinges which serve as the sole support for the foldable support frame. The support frame is formed of a plurality of generally U-shaped frame members with only a rearwardly extending frame member being pivotally connected to the primary hinges and the connection between lower rear ends of a front frame member being carried by forward lower ends of the rear frame member in a manner wherein the bottom ends of the forward frame member move rearwardly as the support frame is folded from an upright cover supporting position to a collapsed position whereby a cross bar of the front frame member moves substantially in a vertical plane so as to clear at all times the rear of a truck cap.

19 Claims, 3 Drawing Sheets

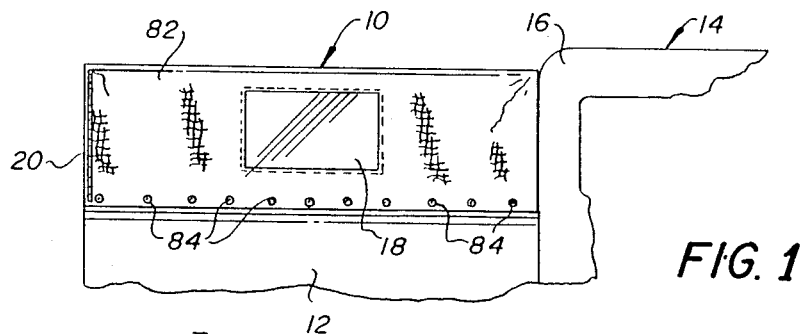
FIG. 1
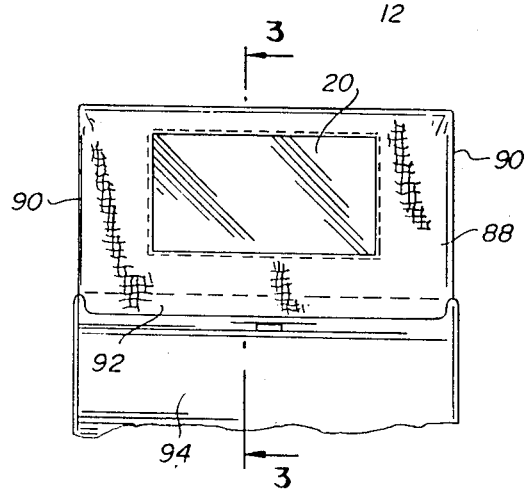
FIG. 2
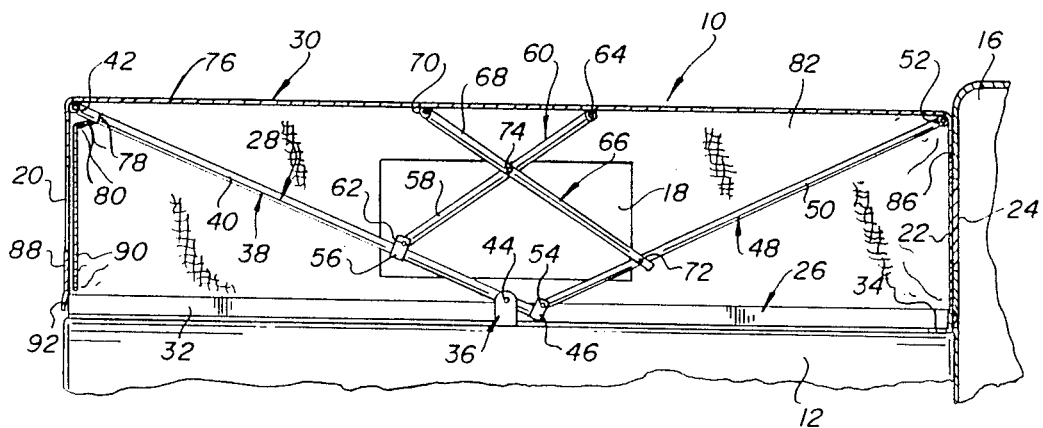
FIG. 3
FIG. 4
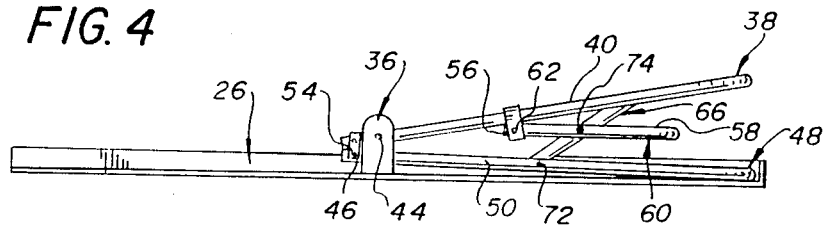

FOLDABLE TOP FOR TRUCK BED

This invention relates in general to new and useful improvements in tops for truck beds, and more particularly to a top for a truck bed which includes a folding frame and a flexible cover.

Customarily truck beds, particularly pickup truck beds, are covered by means of a rigid cap. However, the rigid cap prevents the use of the truck bed in carrying high loads. Also, it restricts the loading of the truck because one cannot work within the cap.

There has also been developed folding covers for truck beds. However, these folding covers normally include rails down opposite sides of the bed and frame members which remain in upright position and which collapse together so that the covering collapses in an accordion like manner. Typical of patents directed to this type of cover construction are U.S. Pat. Nos. 4,721,336, granted Jan. 26, 1988; 4,756,325, granted July 12, 1988 and 4,789,196, granted Dec. 6, 1988.

The foldable top in accordance with this invention includes a bed frame which may be readily clamped or bolted to the truck bed and which bed frame carries a folding support frame which may be readily folded from a collapsed forward position to an erected cover supporting position.

Most particularly, the folding frame structure is carried by two main hinges which are rigidly fixed relative to the bed frame and which form the sole supports for the folding frame members.

Another feature of the invention is that the folding frame members includes a rearwardly directed frame member which is directly hinged to the structural hinges and which, in turn, have hingedly connected thereto a forward extending frame member with the connection between the two frame members being one wherein in the folded state the rear frame overlies the forward frame and as the frame members are folded to cover supporting positions, a cross bar of the front frame member moves vertically so as to remain in substantially constant spaced relation with respect to the back of the truck cab and thus has an erected position which is closely adjacent to the back of the truck cab.

A particular feature of the supporting frame for the foldable top is that all of the support frame members are carried by a pair of structural hinges which are transversely spaced and wherein each hinge is relatively high with the pivot point of rear frame members being spaced above the bases of such hinges and a forward frame member is connected to lower ends of the rear frame member by way of second hinges and in the folded state of the two frame members, lower ends of the rear frame member are disposed rearwardly of the pivot point of the main hinges with the pivot points swinging forward as the structural frame is erected so as to compensate for the upward swinging of a cross bar of the front frame member whereby the cross bar moves substantially vertical.

With the above and other objects in view that will hereinafter appear, the nature of the invention will be more clearly understood by reference to the following detailed description, the appended claims, and the several views illustrated in the accompanying drawings.

FIG. 1 is a fragmentary side elevational view of the top and shows the general relationship thereof with respect to a pickup truck.

FIG. 2 is a rear elevational view of the top and portions of an associated pickup truck bed.

FIG. 3 is a longitudinal vertical sectional view taken generally along the line 3—3 of FIG. 2 and shows the details of the top on an enlarged scale.

FIG. 4 is a longitudinal sectional view similar to FIG. 3 but with the cover omitted showing the supporting frame in a folded state.

Figure 5:
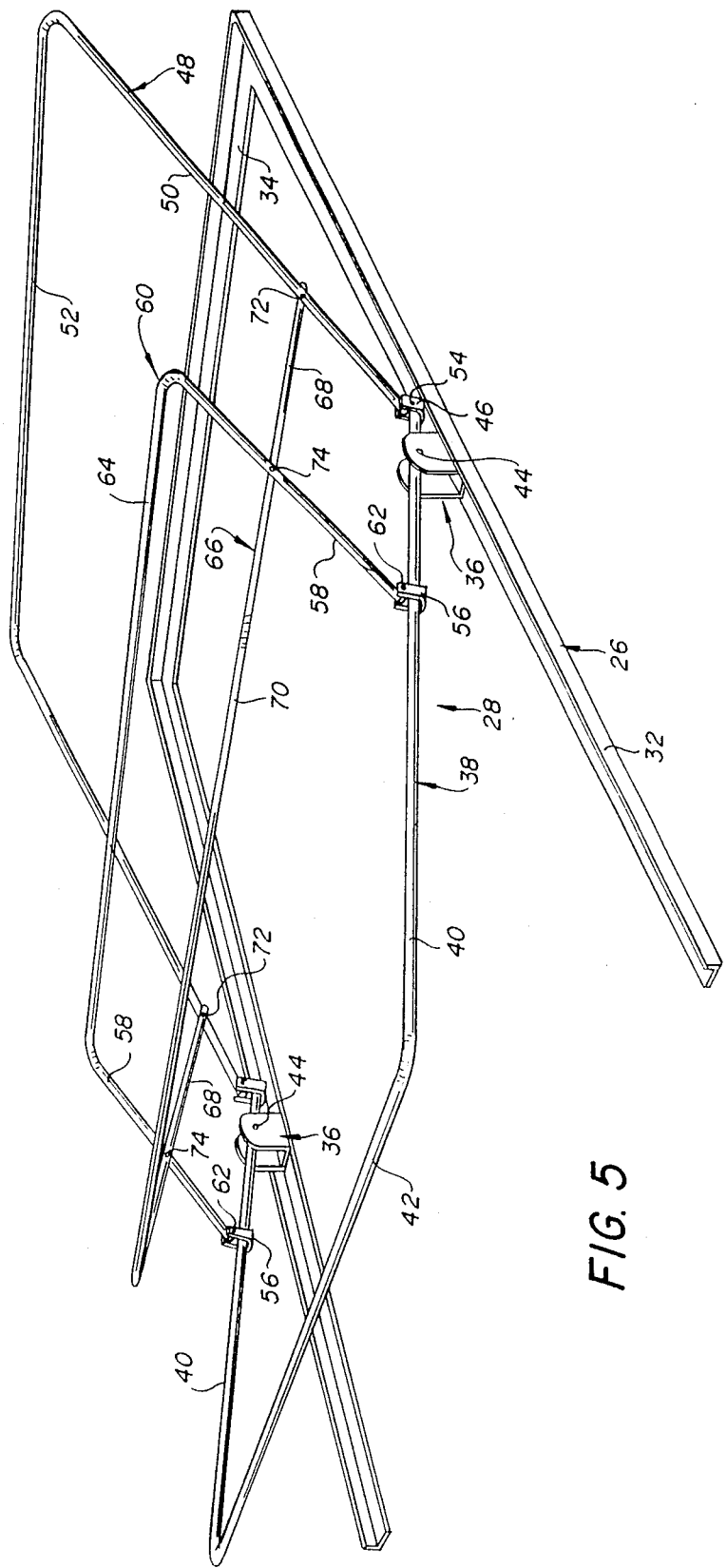
FIG. 5 is a perspective view of the erected frame and associated bed frame.

Referring now to the drawings in detail, it will be seen that there is illustrated in FIG. 1 a top, which is generally identified by the numeral 10 and which is the subject of this invention mounted on a bed 12 of a pickup truck 14 immediately rearwardly of the back of a cab 16 of such pickup truck. Merely for descriptive purposes, it is to be understood that the top may have incorporated therein side windows 18 formed of flexible transparent material, a rear window 20 illustrated in FIG. 2 and a front window 22 illustrated in FIG. 3, the windows 20, 22 being aligned with a customary rear window 24 of the truck cab 16.

Referring now to FIG. 3, it will be seen that the top 10 is formed of three basic components which includes a bed frame 26, a foldable frame 28 carried by the bed frame 26, and a flexible cover 30 which will normally be formed of canvas although other flexible waterproof materials may be utilized.

This invention most particularly relates to the foldable frame 28 and the mounting thereof on the bed rail 26.

The bed rail or bed frame 26 is formed of angle members and includes a pair of longitudinally extending rails 32 and a cross member 34 which are of a rigid construction and which will be secured to the top of the truck bed 12 by means of clamps if it is desired to quickly remove the top 10 or by way of bolts, neither of which are shown.

The rails 32 of the bed frame 26 carry in transverse aligned relation first hinges 36 of a structural construction. Each hinge 36 is U-shaped in cross section as will be described in more detail hereinafter and is relatively high. The hinges 36 carry the folding support frame 28.

The support frame 28 includes a rear first U-shaped frame member 38 which includes a pair of legs 40 having first ends integrally joined by a cross bar 42. Second ends of the legs 40 extend through the hinges 36 and the legs 40 are pivotally connected to the hinges 36 in spaced relation to such second ends by way of pivots 44. In the erected position of the support frame 28, at the second ends of the legs 40 are upstanding second hinges 46.

The structural frame 28 also includes a forwardly extending second frame member generally identified by the numeral 48 which is of a construction similar to the first frame member 38 and includes a pair of parallel legs 50 having first ends joined together by an integral transversely extending cross bar 52. Second ends of the legs 50 are pivotally connected to second ends of the legs 40 by means of pivots 54 carried by the second hinges 46.

The legs 40 carry on the cross bar 42 side of the pivot 44 U-shaped third hinges 56 to which there is connected second ends of legs 58 of a first intermediate frame member 60 by way of pivots 62. First ends of the legs 58 are integrally connected by a transverse cross bar 64.

The support frame 28 further includes a second intermediate frame member 66 which is also of a U-shaped cross section and includes a pair of parallel legs 68 having first ends integrally connected together by a transverse cross bar 70. Second ends of the legs 68 are directly connected to the inner faces of the legs 50 by way of pivots 74. Further, the legs 68 are disposed inside of the legs 58 and are connected thereto by pivots 74.

At this time, for descriptive purposes, the intermediate frame members 60, 66 and their connections form link means between the frame members 38, 48.

Still referring to FIG. 3, it will be seen that the flexible cover 30 includes a top panel 76 which is connected to the cross bars 42, 52, 64 and 70 preferably by way of sleeves 78 which are openable by way of zippers 80 so as to receive the cross bars.

The cover 30 also includes a pair of side panels 82 which are provided with the windows 20. The side panels 82, as is best shown in FIG. 1, are releasably connected to the bed frame 26 by conventional snap fasteners 84.

Next, the cover 30 includes a front panel 86 in which the window 22 is mounted. The lower edge of the front panel 86 is also connected to the bed frame 26 by means of snap fasteners 84.

Finally, the cover 30 includes a rear panel 88 in which the rear window 20 is mounted. The rear panel 88 forms generally a continuation of the top panel 72 and is connected to the rear edges of the side panels 82 by means of vertical zippers or like connectors 90. It will be seen that the rear panel has a lower flap 92 which extends down over the truck bed tailgate as is best shown in FIG. 2.

At this time it is pointed out that in use, if access to the truck bed 12 is desired with the top 10 in its erected position of FIG. 1, the zippers 90 may be disengaged and the rear panel 88 may be lifted up and folded generally at the top of the top 10.

Figure 6:
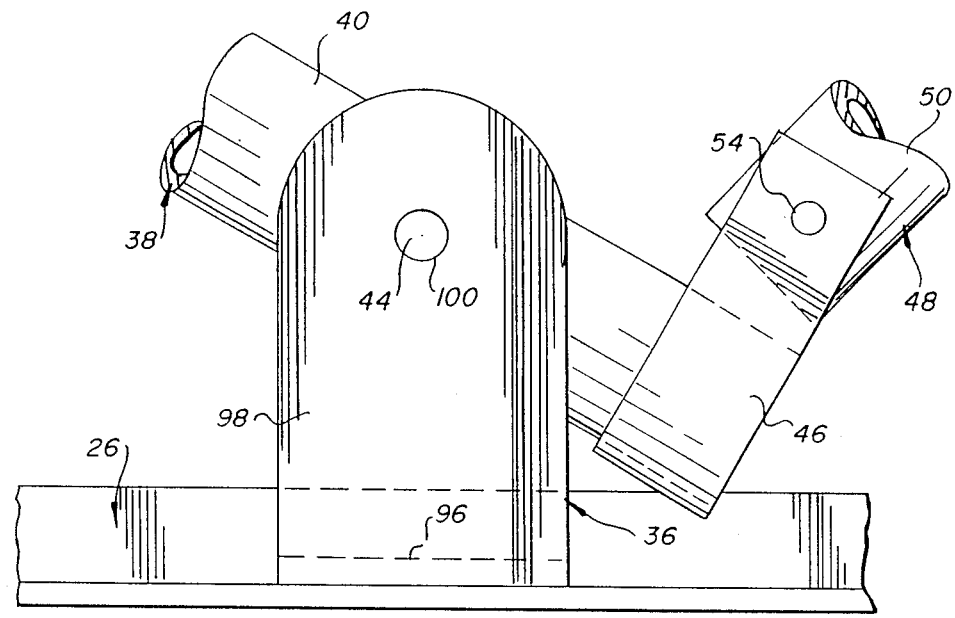
FIG. 6 is an enlarged elevational view showing the mounting of the first and second frame members.
Figure 7:
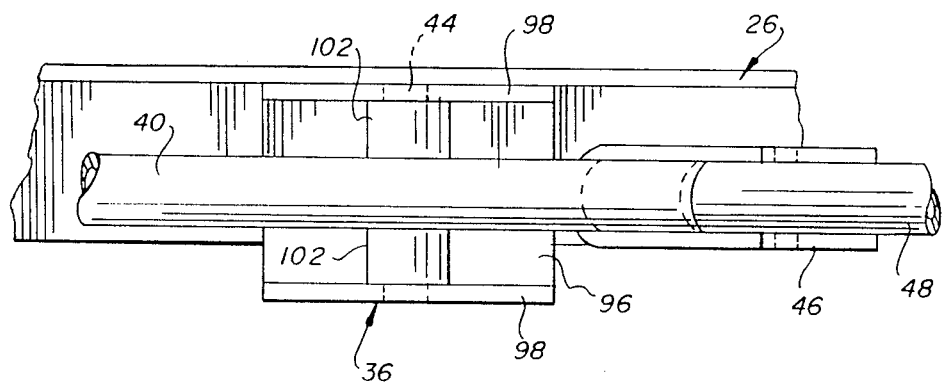
FIG. 7 is a fragmentary top plan view of the mounting of FIG. 6.

Reference is now made to FIGS. 6 and 7 wherein there is illustrated in more detail the mounting of the frame members 38, 48 on one of the hinges 36. First of all, it is to be noted that in the preferred embodiment of the invention, each hinge 36 is of a heavy construction and includes a base portion 96 which is seated on end is secured to the base frame 26 in a very rigid construction. The hinge 36 may be formed of aluminum stock having a thickness on the order of 0.188 inch and will have two upstanding legs 98 which may have a width on the order of 4 inches. Each of the legs 98 will have a height such that a bore 100 for the pivot 44 will be spaced on the order of 4½ inches above the base 96. The frame members 38, 48 are preferably formed of 1 inch O.D. aluminum tubing with a leg 40 being centered between the hinge legs 98 by spacers 102.

It will be seen that each hinge 46 is mounted on the extreme end of each leg 40 and in the preferred embodiment of the invention is formed of aluminum strapping which closely fits the leg 40.

It will be seen that the height of the pivot 44 is such that when the frame member 38 is pivoted in a clockwise direction, there will be ample clearance for the hinge 46 and the second end of an associated leg 50 to pass under the pivot 44 and through the hinge 36 as the frame member 48 is pivoted to a generally flat position in the bed frame 26 while the frame member 38 is free to swing towards a generally flat position overlying the frame member 48.

Referring now most specifically to FIG. 4, it will be seen that when the support frame 28 is folded to a relatively flat state, the frame member 38 is folded into generally overlying relation with respect to the frame member 48 with the second end of the legs 40 passing through the hinge 36 and moving the second ends of the legs 50 to the left. As a result, the cross bar of the frame member 48 moves downwardly in a substantially vertical plane and the frame member 48 is generally seated in the bed frame 26. The frame member 60 pivots to a position where the legs 58 thereof are disposed between the legs 40 and 50 of the frame members 38, 48. The frame member 66 pivots to a position generally within the frame members 38, 48.

It is to be understood that the covering 30 has been purposely omitted in FIG. 4 so as to clearly illustrate the relationship of the various frame members in the folded state of the top. At this time it is particularly pointed out that the side panels 82 of the cover 30 must be partially released from the bed frame 26 starting at the rear of the bed frame. However, the cover 30 will remain attached to the cross bars of all the frame members.

While no specific reference has been made to FIG. 5, it will be seen that the various components of the bed frame and the support frame are clearly illustrated in that view so that a complete understanding of the structural relationship of the various components of the bed frame 26 and the support frame 28 is clearly understood.

Although only a preferred embodiment of the top and more particularly the support frame for the cover of the top has been illustrated and described, it is to be understood that minor variations may be made in the top and support frame without departing from the spirit and scope of the appended claims.

I claim:

1. A folding support frame for a flexible cover for a truck bed, said support frame including a pair of transversely aligned upstanding first hinges, a first generally U-shaped frame member including two legs joined together at first ends by a first cross bar and pivotally connected to said first hinges adjacent second ends, second hinges carried by said first frame member generally at said second ends second frame member having first ends joined by a second cross bar and second ends pivotally connected to said second hinges, and link means extending between legs of said first and second frame members for effecting simultaneous hinging of said frame members means for attaching said first hinges to a truck bed.

2. A folding support frame according to claim 1 wherein in a folded state of said support frame said first frame member overlies said second frame member.

3. A folding support frame according to claim 1 wherein in a folded state of said support frame said first frame member overlies said second frame member, and said second hinges lie on a side of said first hinges remote from said first and second cross bars.

4. A folding support frame according to claim 1 wherein in a folded state of said support frame said first frame member overlies said second frame member, and said second hinges lie on a side of said first hinges remote from said first and second cross bars, and said legs of said second frame member extend through said first hinges.

5. A folding support frame according to claim 1 wherein in a folded state of said support frame said first frame member overlies said second frame member, and said second hinges lie on a side of said first hinges remote from said first and second cross bars, and said legs of said second frame member extend through said first hinges, whereby when said support frame is erected, said second hinges move towards an original position of said second frame member cross bar and said second frame member cross bar moves in a substantially vertical plane.

6. A folding support frame according to claim 3 wherein in an erected state of said frame said first and second cross bars lie on opposite sides of said first hinges.

7. A folding support frame according to claim 3 wherein in an erected state of said frame said first and second cross bars lie on opposite sides of said first hinges, and said second hinges lie on the same side of first hinges as said second cross bar.

8. A folding support frame according to claim 3 wherein in an erected state of said frame said first and second cross bars lie on opposite sides of said first hinges, and said second hinges lie on the same side of first hinges as said second cross bar, and in an erected state said first and second cross bars are disposed on opposite sides of said first hinges and approximately at the same elevation.

9. A folding support frame according to claim 1 wherein said link means includes two intermediate frame members arranged in crossing relation and pivotally connected together, each of said intermediate frame members being of a U-shaped configuration and each including a pair of legs having first ends joined by a cross bar.

10. A folding support frame according to claim 9 wherein a first one of said intermediate frame members has second leg ends pivoted to legs of said first frame members and a second one of said intermediate frame members has second leg ends pivoted to legs of said second frame member.

11. A folding support frame according to claim 10 wherein said second intermediate frame member lies within all of the others of said frame members and is directly pivotally attached to said first intermediate frame member and said second frame member.

12. A folding support frame according to claim 10 wherein said first and second frame members and said first intermediate frame members are all in alignment, and second ends of said intermediate frame member legs are joined to said first frame member legs by third hinges.

13. A folding support frame according to claim 9 wherein in the erected state of said support frame, all of said cross bars substantially lie in a single plane.

14. A folding support frame for a flexible cover for a truck bed, said support frame including a bed frame for attachment to a truck bed, a pair of transversely aligned upstanding first hinges, first hinges rigidly carried by said bed frame, a first generally U-shaped frame member including two legs joined together at first ends by a first cross bar and pivotally connected to said first hinges adjacent second ends, second hinges carried by said first frame member generally at said second ends, a second generally U-shaped frame member including two legs joined together at first ends by a second cross bar and second ends pivotally connected to said second hinges, and link means extending between legs of said first and second frame members for effecting simultaneous hinging of said first and second frame members.

15. A folding support frame according to claim 14 wherein said frame members lie in plane lying within said bed frame.

16. A folding support frame according to claim 14 together with a flexible cover carried by said folding support frame and having free edges attached to said bed frame.

17. A folding support frame according to claim 16 wherein said cover is connected to said cross bars.

18. A folding support frame according to claim 16 wherein said cover includes a rear flap swingably attached to the remainder of said cover for access to an associated truck bed.

19. A folding support frame according to claim 1 wherein said first hinges are structural members and provide the sole supports for said frame members and said link means.

* * * * *